Patented Sept. 5, 1950

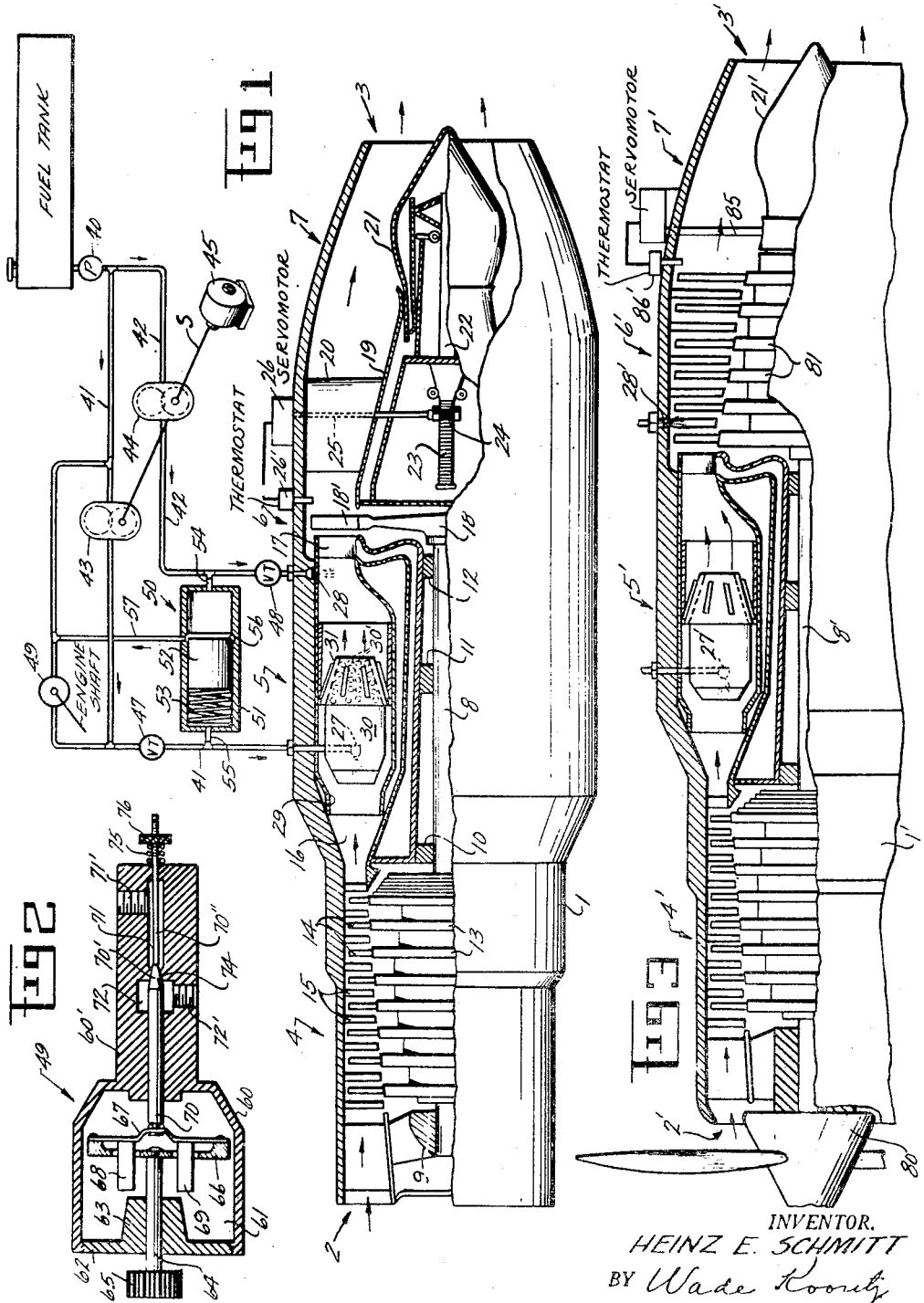

2,520,967

UNITED STATES PATENT OFFICE 2,520,967

TURBOJET ENGINE WITH AFTERBURNER AND FUEL CONTROL SYSTEM THEREFOR

Heinz E. Schmitt, Patterson Field, Ohio

Application January 16, 1948, Serial No. 2,794

7 Claims. (Cl. 60—35.6)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a turbo-jet engine or gas turbine having an afterburner as a means for effecting thrust increase.

The primary object of the invention is to provide a turbo-jet engine wherein an auxiliary fuel injection system is used to inject fuel into the flowing gases before the gases reach the turbine, whereby the added fuel burns rearwardly of the turbine to give an increased thrust.

A secondary object of the invention is to provide a turbo-jet engine or gas turbine having a main fuel injection system and an auxiliary fuel injection system and having a control system capable of governing the operation of both the main and auxiliary fuel injection systems.

Another important object of the invention is to provide a turbo-jet engine or gas turbine having an auxiliary or secondary fuel injection system in which the injection nozzles thereof are protected from the hot gases flowing through the engine or turbine and are at the same time so placed as to offer no resistance to gas flow through the engine or turbine.

Another object of the invention is to provide a turbo-jet engine or gas turbine having an auxiliary or secondary fuel injection system to give the increased thrust characteristic of an afterburner but without at the same time increasing the overall length of the engine or turbine to any appreciable extent.

Another object of the invention is to provide an improved fuel system for a turbo-jet engine or gas turbine.

Another object of the invention is to generally improve the construction, operation and propulsive effectiveness of turbo-jet engines and gas turbines. A related object is to provide an improved high-output propulsion unit for high-speed aircraft.

The above and other objects of the invention will become apparent on reading the following detailed description in conjunction with the drawing, in which:

Fig. 1 is a partial sectional view taken longitudinally through a turbo-jet engine and illustrating diagrammaticaly the fuel injection system for the engine.

Fig. 2 is a longitudinal cross sectional view taken through an automatic bypass valve forming one unit of the fuel injection system.

Fig. 3 is a partial sectional view taken longitudinally through a turbo-jet engine having an air screw driven thereby, or in other words showing the invention as applied to a turbo-propjet.

The turbo-jet engine as used on modern aircraft comprises an air compressor, a combustion chamber, a gas turbine and tail pipe or exhaust jet with the arrangement being such that as the aircraft moves through space a continuous supply of air flows through the four units in the order named. While such an engine affords a means to develop very high speed in the aircraft the amount of thrust exerted is apt to be relatively low, thus resulting in poor takeoff characteristics for the aircraft. In order to obtain the desired forward speed without too long a takeoff run it is desirable to have some type of thrust augmenter. One type proposed and used to some extent is known as an afterburner, and is usually in the form of a tail pipe extension on the engine having fuel burners therein to boost the expansion of gases prior to passing into the atmosphere rearwardly of the engine. This type of structure is comparatively simple and reliable, but adds greatly to the overall length of the engine. Furthermore the total consumption of fuel is thereby increased to a marked extent, because of the poor combustion efficiency obtained and the resistance to gas flow caused by adding fuel burners projecting into the interior of the afterburner chamber. The overall efficiency or net gain of the afterburner is also apt to be poor because not all of the heat of combustion theoretically available is actually useful to increase the engine thrust, due to the fact that some of the fuel burns in the atmosphere rearwardly of the afterburner and contributes nothing toward expansion of gases within the engine or afterburner thereof. If turbulence is increased by the addition of swirl vanes in the afterburner, the fuel is burned more completely within the afterburner but the resistance to gas flow is further increased by the vanes or other turbulence producing means. Moreover the high temperatures in the afterburner result in burning out of fuel nozzles and other projecting elements very rapidly. In general the conventional afterburner as described above is too wasteful of fuel to be really practical.

Turbo jet engine

The present present invention proposes to provide a thrust augmenter for jet engines having the simplicity of an afterburner but which largely overcomes the disadvantages of conventional afterburners as described above. The present invention also proposes to provided a thrust augmenter which may be used for relatively long periods of time without consuming excessive quantities of fuel, thus providing a high-output propulsion unit capable of exerting large thrust for takeoff and extra speed and also adapted to give economical performance over long distances at a reduced thrust when desired.

For a description of one specific embodiment of the invention reference is made to Fig. 1 of the drawing. The turbo-jet engine as shown comprises a casing or housing 1 of circular cross section having an inlet or intake 2 and outlet or discharge nozzle 3. Proceeding from the inlet end to the outlet end the casing contains the air compressor 4, combustion chamber 5 and the gas turbine 6. Air compressed by the compressor 4 is used to support combustion of liquid fuel (such as kerosene or fuel oil) in the chamber 5 and the greatly increased volume of heated gases is then fed through the turbine and thence outwardly through the tail pipe 7 and discharge nozzle 3 to cause the reaction effect on the engine producing forward movement in a direction opposite to that of the stream of hot gases. The purpose of the turbine is to drive the air compressor 4, by means of the main shaft 8 connecting the rotor assembly of the turbine with the rotor assembly of the air compressor. There are a number of combustion chambers 5 arranged around the engine at equally spaced intervals. These chambers which are of the "can" type in the present example, will be described in more detail below.

The main shaft 8 of the engine is supported for rotation in bearings 9, 10, 11 and 12. The air compressor 4 comprises a rotor assembly having a series of rotor elements 13 fixed on the shaft 8, the rotor elements each having a series of peripheral vanes thereon. The vanes 14, which decrease in length as the air becomes more compressed, are of concave cross sectional shape and are arranged to force the air forwardly past the stationary guide vanes 15 into impinging relation with respect to the next set of rotor vanes or blades. This staging of the compression process acts to gradually increase the static pressure of the air so that as it flows past the last set of stationary guide vanes it will be under high pressure. The air passes into the chambers 5 by way of a manifold 16. The air passes from the manifold into the combustion chambers where fuel is burned, thereby causing an increase in temperature which results in increase in volume of the gases. There is generally a large excess of air over that required for complete combustion of the fuel, the excess averaging about five times minimum air requirements. The turbine 6 comprises a peripheral set of stationary vanes 17 and a movable set of vanes 18' carried on the turbine rotor 18. The hot gases, now decelerated from passing through the turbine, continue moving through the tail pipe 7 and on out through the discharge nozzle 3.

Located centrally within the tail pipe there is an air regulating bullet and associated supporting structure. A double walled shell 19 of frusto-conical shape is secured to the casing 1 by struts, such as the strut 20 having a streamlined cross section. The outer wall of the shell 19 extends rearwardly over a portion of the bullet 21, while the bullet itself carries a forwardly extending rack bar 22 provided with teeth at the forward end 23. Movement of the bar and the attached bullet is effected by means of a pinion gear 24 carried on a drive shaft 25 adapted for rotation by a servo motor 26. Actuation of the servomotor 26 is controlled by a thermostat device 26' which includes a temperature sensitive element extending into the turbine housing just rearwardly of the turbine blades. The thermostat functions, like similar devices as employed in temperature controls for furnaces, to move the bullet 21 in such a manner as to maintain a constant temperature rearwardly of the turbine. The temperature as so maintained is usually the highest possible one for continuous safe operation of the turbine. The manner in which the bullet functions to maintain a constant temperature is not obvious but will be explained under the section entitled "Fuel Control System." A further explanation of the construction and operation of a similar bullet arrangement may be found on pages 121 and 122 of "Gas Turbines and Jet Propulsion for Aircraft" by G. Geoffrey Smith (4th edition, 1946).

Considering the fuel and combustion system more carefully it is noted that the engine is provided with a set of primary fuel burners, as at 27, and a set of secondary fuel burners, as at 28. Assuming that there are six combustion chambers arranged around the engine then there will be six burners in the primary set and six burners in the secondary set. The "can" type of combustion chamber as shown comprises a cylindrical sheet metal flame tube 29 within which is mounted a retort or muffle chamber 30 surrounding the fuel burner or fuel injection nozzle 27. The rear end of the retort 30 is tapered slightly and is pierced by numerous openings 30' through which flame may thus escape and pass rearwardly through an outer muffle cone 31 spaced from the conical rear end of the retort, to provide for the passage of air and burning fuel. The heated gases proceed rearwardly toward the turbine 6 and due to the rapid expansion under heat evolved, besides the narrowing down of the combustion chamber toward the rear end thereof, the gas velocity becomes very high before the gas enters the fixed turbine blades 17. As the hot gases impart rotation to the turbine rotor 18 they give up part of their kinetic energy and cool off to some extent. The resulting decrease in volume and loss of kinetic energy tends to reduce the propulsive effort of the engine. However by the addition of more heat to the gases a corresponding boost in thrust is obtained. To accomplish this desirable result the engine is provided with the secondary fuel burners 28 which are recessed into the wall of casing 1. This thrust augmenting means may of course be turned on or off at will as will be explained. The burner 28 as shown in Fig. 1 may discharge fuel into the combustion chamber in a direction normal to the direction of gas flow or may be turned slightly either way from this normal direction. The relative spacing from the turbine may also be changed to some extent if desired. Due to the high velocity of the gas flow, the added fuel is carried through the turbine blades and into the tail pipe before it begins to burn, and therefore does not cause excessive heating of the turbine blades but rather has a slight cooling action thereon. Furthermore the action of the turbine rotor on the fuel and air causes good mixing and vaporization of the fuel. As an example of the performance of the present afterburner, the burner 28 may be set six inches ahead of the fixed turbine blades 17 and the ignition lag will be such that flame propagation will begin about one foot behind the moving turbine blades 18'. Thus there will be a reheating of the air and products of combustion in the tail pipe and the resulting expansion of the gases will give a substantial thrust increase. By this arrangement no added parts are required except the fuel burners 28, and no tail pipe extension is required as with afterburners of the conventional type. The burners 28 being housed entirely within the walls of the casing 1 there is no danger of burning up the fuel nozzles thereof by the heated gases passing through the engine. Since the casing wall is always made of two concentric shells spaced apart, the cooling air passing between the shells will cool the fuel nozzles 28 and also the feed pipes adjacent thereto. The ignition lag of the fuel from the secondary fuel supply may be governed by the angle of fuel injection. For instance if the nozzles 28 are rotated slightly so as to cause the fuel to have a counterflow action with respect to the air, then the flame propagation will begin at a distance behind the turbine less than the one foot stated above. Conversely if the nozzles are rotated oppositely from the normal, then the fuel will tend to flow with the air and flame propagation will begin at a distance behind the turbine more than the one foot normal average. So many conditions will affect the ignition lag, such as the flash point of the fuel, temperature and velocity of the hot gases, fuel injection pressure and combustion chamber design, that the example stated must be understood to be subject to considerable variation.

*Fuel control system*

The fuel control system suitable for use with the present turbo-jet engine is shown in Fig. 1. Fuel is carried in the fuel tank so indicated and feeds into a fuel delivery pump 40 which is a low-head pump of any suitable type, such as a centrifugal vane type, which is merely for the purpose of overcoming fluid friction in the lines and to insure delivery of fuel as long as any quantity remains in the tank. From the delivery pump the fuel passes into the primary and secondary fuel lines 41 and 42. Interposed in the respective fuel lines 41 and 42 are fuel pumps 43 and 44, both of which are driven by means of a small electric motor 45, or in accordance with the usual practice the fuel pumps may be driven by an auxiliary drive shaft geared or otherwise coupled to the engine main shaft. The drive connection from the motor to the fuel pumps is represented by a line S. As illustrated the fuel pumps are of the gear type to obtain a positive pressure on the fuel flowing toward the fuel burners or injection nozzles 27 and 28. Interposed in the fuel lines 41 and 42 there are also the fuel cut-off valves 47 and 48, which are preferably throttling valves for proper adjustment of fuel flow rates. Connected around the primary fuel pump 43 there is a bypass valve 49. This valve which is shown in Fig. 2 in cross section is coupled by suitable gearing to the engine shaft 8 so as to open at high engine speeds, thus acting as a speed governor for the engine. As the valve 49 opens the pressures on both sides of the pump 43 become more nearly equal and the injection pressure at the primary injection nozzle 27 diminishes. With reduced injection pressure the fuel consumption decreases, thus limiting the top speed of the engine to a safe maximum. One possible construction for the bypass valve will be described below. It is noted also that the bypass valve is effective to limit engine speed at high altitudes, where the fuel-air ratio increases due to the rarefied atmosphere. As this important ratio increases the engine speed increases, thus causing the bypass valve to open and acting to reduce the fuel injection pressure at the primary fuel nozzles. The rate of fuel flow being reduced the fuel-air ratio decreases to thus prevent overspeeding of the engine.

The control unit 50 for coordinating the action of the primary and secondary fuel nozzle comprises a closed cylinder 51 having a piston 52 freely slidable therein. At one end of the cylinder there is a light coil spring 53 tending to move the piston 52 toward the opposite end of the cylinder, where there is a connection 54 from the secondary fuel line 42. At the end of the cylinder adjacent to the spring there is a connection 55 from the primary fuel line 41. Intermediate of its length the cylinder is internally grooved at 56 and connected from this groove to the inlet side of the primary fuel pump 43 there is a conduit 57.

The bypass valve 49, which is a speed governor for the engine, may have various structural arrangements but for purposes of illustration such a governor valve is shown in Fig. 2. The valve includes a housing 60 having a large cavity 61 closed by an end plate 62. A bearing boss 63 on the end plate serves to rotatably mount a shaft 64 carrying a gear 65 adapted to be driven through suitable gearing by the engine shaft 8. The governor shaft 64 drives a circular plate 66 directly and extending diametrically across the plate is a steel leaf spring 67 secured at its opposite ends to the plate or disk 66. Rigidly mounted on the spring 67 there are two governor weights 68 and 69 which extend through slots in plate 66 and which are responsive to centrifugal force to cause bowing of the spring 67. The central portion of the spring 67 is provided with an opening to rotatably receive the actuating end of the valve stem 70. The valve stem is slidable within a housing extension 60', having an inlet cavity 71 and an outlet cavity 72. Inlet opening 71' and outlet opening 72' provide means to make conduit connections with cavities 71 and 72 respectively. The valve stem 70 has an intermediate conical portion 70' cooperating with a valve seat 74 between cavities 71 and 72. The stem 70 includes an extension 70'' having a threaded end outside the housing extension 60' and surrounded by a compression spring 75 held between the end of housing extension 60' and the spring adjustment nut 76. The opening of the bypass valve to lower the pressure differential across the primary fuel pump takes place as the weights 68 and 69 are caused to swing away from the shaft 64 under centrifugal force due to shaft rotation. The consequent bowing of the leaf spring 67 to the left in Fig. 2 carries the valve stem in the same direction thus opening the valve. The spring 67 is designed to give very little valve action until high engine speeds are reached, and the action of the spring 67 in resisting this valve action is reinforced by the adjustable compression spring 75. By adjusting the spring 75 carefully the maximum engine speed may be governed by the valve 49 within fairly close limits.

The bypass valve also functions to maintain a constant maximum temperature just rearwardly of the turbine, in cooperation with the movable bullet 21. For an example assume that the engine is on an aircraft that has climbed to 10,000 feet. At this altitude the fuel-air ratio is higher than at sea level, or at some lower level. Therefore for the same rate of air flow on a weight basis there is a greater rate of fuel flow on a weight basis. This means higher temperatures in the engine and greater turbine speed, tending to open the bypass valve and reduce the fuel injection pressure. With reduced injection pressure the rate of flow of primary fuel is reduced and the fuel-air ratio is reduced accordingly, thus limiting the top speed of the engine. The bullet servomotor 26 is so connected to the thermostat 26' that increase in temperature above an arbitrary safe limit at the thermostat sensing element tends to move the bullet in a retracting direction to open the exhaust nozzle 3 wider. Assuming the conditions as above where the fuel-air ratio has risen at high altitude, or for some other reason, the resulting temperature increase not only tends to speed up the turbine and to retract the bullet 21 but also tends to increase the back pressure on the turbine because of the throttling effect of the exhaust nozzle 3. This rise in back pressure tends to slow down the turbine, unless the bullet is retracted still farther. However since the tendency of the turbine to slow down also results in a tendency for greater fuel flow, the temperature rearwardly of the engine will rise until the bullet 21 retracts sufficiently to reduce the back pressure, speed up the turbine and reduce the rate of fuel flow. Thus by the arrangement disclosed the maximum turbine speed is limited, and the maximum temperature at or near the turbine blades is also limited not only by the action of the speed governor 49 but by the action of the nozzle bullet 21.

Operation of the fuel control system will now be summarized. The primary and secondary fuel pumps 43 and 44 are maintained in operation at all times. For cruising or idling of the aircraft the primary fuel valve 47 is in open position with the secondary fuel valve 48 closed. Pressure in line 41 will supply the primary fuel burners, while pressure in line 42 will cause retraction of the control piston 52 to the position of Fig. 1. The line 57 now being in communication with the interior of cylinder 51, secondary fuel pump 44 will circulate fuel which will be fed to line 41 and thus flow to the primary fuel burners. Thus any heating effect on the fuel by the action of the secondary fuel pump will not be wasted, since the fuel will thus be preheated but only to a small extent.

Now assuming that the engine is required to exert extra thrust, the secondary fuel valve 48 is turned on while the primary fuel valve remains turned on. Since the secondary fuel burners 28 may now receive fuel from the line 42, the pressure exerted against the piston 52 by the secondary fuel will be reduced and the piston will move to the right because of the spring 53 and the connection 55. The piston will now close off the groove 56 and the primary and secondary fuel systems will function more or less independently of each other. The primary fuel system will continue to perform its regular functions including the expansion of gases necessary to drive the turbine and provide engine thrust. The secondary fuel system will provide for substantial reheating and expansion of gases rearwardly of the turbine to give a boost in the thrust exerted by the engine. The additional oxygen required to burn the secondary fuel is certain to be present in the tail pipe, since there is always a large excess of air available for combustion. This is a characteristic of modern turbo-jet engines. While the tail pipe structure and the bullet may become overheated with the secondary fuel burners operating, it should be understood that the extra thrust produced is only needed for emergencies. It is also emphasized that the secondary fuel valve 48 is a throttling type, by which the rate of flow to the secondary burners may be adjusted to give a variable auxiliary thrust effect.

The particular location of the secondary fuel nozzles 28 has certain inherent advantages such as avoidance of any increase in the overall length of the engine, avoidance of increased weight of the tail pipe assembly and elimination of pressure drop caused by the conventional afterburner. Furthermore by locating the secondary fuel nozzles adjacent to and forwardly of the gas turbine, the ignition delay prevents burning of the secondary fuel while passing through the turbine blades whereby the turbine acts as a flame arrester. The secondary fuel while passing through the turbine is evaporated and has a slight cooling effect on the turbine blades. Upon entering the tail pipe 7 combustion of the secondary fuel will proceed and will be substantially complete by the time the fuel and gas mixture issues from the exhaust nozzle 3.

With the secondary fuel burners in operation the adjustable bullet 21 is even more necessary than during normal operation. The expansion of gases caused by the secondary burners will tend to build up back pressure on the turbine thus slowing its rotative speed somewhat. A tendency to slow down the turbine will also tend to give a higher rate of primary fuel flow and the resulting increase of temperature rearwardly of the turbine will actuate the thermostat 26' and servomotor 26 to retract the bullet 21. The back pressure on the turbine will accordingly be reduced. The control system being automatic in operation the bypass valve 49 and the bullet 21 will accordingly adjust themselves to maintain a temperature at the thermostat sensing element just behind the turbine always below a predetermined maximum.

The control unit 50 functions as described above but in addition serves to prevent the secondary fuel burners from receiving more than their proportionate amount of fuel when the secondary fuel valve 48 is in "on" position. For example the secondary burners may be designed for a maximum flow rate of 75 per cent of the maximum flow rate to the primary burners. Should the primary fuel line become clogged or blocked between the fuel delivery pump 40 and the primary fuel pump 43, the pressure at the connection 55 would be reduced thus moving the piston 52 to the left because of pressure at the connection 54. The secondary fuel line 42 would now supply fuel to the primary fuel pump 43 through the conduit 57 and the primary fuel system would continue to function. It is understood that the pressure balance on the control piston 52 is delicate and that the light spring 53 must be selected with care to provide only a slight overbalance of the piston toward the right.

Turbo-jet engine with propeller

For a description of a modified or alternative embodiment of the invention reference is made to Fig. 3. The aircraft engine as shown in Fig. 3 is a turbo-jet engine having a propeller driven by the main shaft and having a multi-stage gas turbine to drive both the air compressor and the propeller. The engine comprises a housing or casing 1' of circular cross section having an inlet opening 2' and a discharge nozzle 3'. Proceeding from the inlet end to the outlet end the casing contains the air compressor 4', combustion chambers 5', gas turbine 6' and tail pipe 7'. The arrangement of these various units is so similar to the arrangement as previously described in connection with Fig. 1 that a detailed description is not necessary. However it is noted that the gas turbine 6' is staged so as to obtain more power at the main shaft 8'. This additional power is needed to turn the propeller 80. The propeller provides a large part of the thrust to drive the aircraft although, as in Fig. 2, there is considerable thrust provided by the jet reaction. In the illustrated engine the turbine 6' has six rotor sections 81 turning together as a unit, and the turbine is therefore a six-stage gas turbine. The turbine blades are of increasing length toward the rear of the engine, because the gases lose some of their kinetic energy in each stage of the turbine. As the gas velocity is reduced the density decreases, the later turbine stages thus operating on gas of lower density.

Liquid fuel is supplied to the primary fuel burners 27' and when extra thrust is required fuel is also supplied to the secondary fuel burners 28'. The latter burners are arranged around the casing 1', and extend through the casing wall at points between the fixed turbine blades of one stage of the turbine. The stage selected may vary according to the engine design, but may be so selected that the ignition lag will not permit the secondary fuel to start burning until the atomized fuel reaches a point behind the last turbine stage or in case it is desired to reheat the gases before leaving the turbine the location and arrangement of the secondary nozzles may be selected so that fuel combustion will begin within the turbine. Reheating within the turbine is desirable where added power is required on the main shaft. As in the engine of Fig. 1 the secondary fuel burners are only turned on to give an extra thrust effort for higher speed or more rapid climb. Since the fuel control system as described and illustrated in connection with Fig. 1 may be used equally as well with the engine of Fig. 3, this portion of the disclosure is not repeated. Also it is desirable to provide an adjustable exhaust nozzle by the use of a movable bullet 21', thus giving a variable cross sectional area according to the axial position of the bullet. As described in conjunction with Fig. 1 there is a servomotor 86 and thermostat 86', with the thermostat sensing element being located just behind the last turbine stage. The servomotor 86 drives a shaft 85 for actuating the movable bullet 21' in a manner similar to the actuation of the movable bullet 21 of Fig. 1. Cooling air circulating rearwardly between the spaced walls will thus act to cool the secondary fuel burners 28'. The number of secondary fuel burners arranged around the engine may vary, but in general it is preferable to use six or more for better distribution of the secondary fuel.

While the invention has been described in connection with two specific engine structures it should be understood that it is capable of application in most turbo-jet engines. The embodiments of the invention herein shown and described are to be regarded as illustrative only and it is to be understood that the invention is susceptible to variations, modifications and changes within the scope of the appended claims.

I claim:

1. A turbo-jet engine comprising, an air compressor, a combustion chamber rearwardly of the compressor and receiving air at one end from the air compressor, a gas turbine at the other end of the combustion chamber and adapted to be driven by heated gases flowing from the combustion chamber, a main drive shaft connecting the air compressor and the gas turbine, a tail pipe and exhaust nozzle rearwardly of the gas turbine for conducting heated exhaust gases from the turbine and for discharging said gases into the atmosphere rearwardly of the turbo-jet engine, a primary fuel nozzle in the combustion chamber adjacent to the air compressor adapted to inject primary fuel for combustion thereof in said combustion chamber, and a secondary fuel nozzle adjacent to and forwardly of the gas turbine adapted to inject secondary fuel transversely into the stream of heated gas moving from the combustion chamber for combustion of said secondary fuel only in said tail pipe, an axially movable bullet member mounted in said tail pipe for changing the cross sectional area of said exhaust nozzle, a servomotor having means driven thereby for moving said bullet member, a thermostatic control unit including a temperature sensing element located in said tail pipe adjacent to said turbine for controlling said servomotor and adapted to maintain a temperature at said sensing element below a predetermined maximum.

2. A turbo-jet engine comprising, an air compressor, a combustion chamber receiving air at one end from the air compressor, a gas turbine at the other end of the combustion chamber and adapted to be driven by heated gases flowing from the combustion chamber, a main drive shaft connecting the air compressor and the gas turbine, a tail pipe and exhaust nozzle for conducting heated exhaust gases from the turbine and for discharging said gases into the atmosphere, a primary fuel nozzle in the combustion chamber adjacent to the air compressor adapted to inject primary fuel for combustion thereof in said combustion chamber, and a secondary fuel nozzle adjacent to the gas turbine adapted to inject secondary fuel transversely into the stream of heated gas moving from the combustion chamber for combustion of said secondary fuel in said tail pipe, an axially movable bullet member mounted in said tail pipe for changing the cross sectional area of said exhaust nozzle, a servomotor having means driven thereby for moving said bullet member, a thermostatic control unit including a temperature sensing element located in said tail pipe adjacent to said turbine for controlling said servomotor and adapted to maintain a temperature at said sensing element below a predetermined maximum, a fuel supply tank, a primary fuel line to conduct fuel from said tank to said primary fuel nozzle, a secondary fuel line to conduct fuel from said tank to said secondary fuel nozzle, a primary fuel pump in said primary fuel line, a secondary fuel pump in said secondary fuel line, means for driving both of said fuel pumps simultaneously, a bypass valve connected across said primary fuel pump and including means connected to the engine main drive shaft responsive to shaft speed above a safe maximum for opening said bypass valve.

3. A turbo-jet aircraft engine comprising, an air compressor, a combustion chamber receiving air at one end from the air compressor, a multistage gas turbine at the other end of the combustion chamber and adapted to be driven by heated gases flowing from the combustion chamber, a main drive shaft connecting the air compressor and the gas turbine, an air screw mounted on said shaft forwardly of said air compressor, a tail pipe and exhaust nozzle for conducting heated exhaust gases from the turbine and for discharging said gases into the atmosphere, a primary fuel nozzle in the combustion chamber adjacent to the air compressor adapted to inject primary fuel for combustion thereof in said combustion chamber, and a secondary fuel nozzle adapted to inject secondary fuel into an intermediate stage of said multistage gas turbine for combustion of said secondary fuel in said tail pipe, an axially movable bullet member mounted in said tail pipe for changing the cross sectional area of said exhaust nozzle, a servomotor having means driven thereby for moving said bullet member, a thermostatic control unit including a temperature sensing element located in said tail pipe adjacent to said turbine for controlling said servomotor and adapted to maintain a temperature at said sensing element below a predetermined maximum.

4. A turbo-jet aircraft engine comprising, an air compressor, a combustion chamber receiving air at one end from the air compressor, a multistage gas turbine at the other end of the combustion chamber and adapted to be driven by heated gases flowing from the combustion chamber, a main drive shaft connecting the air compressor and the gas turbine, an air screw mounted on said shaft forwardly of said air compressor, a tail pipe and exhaust nozzle for conducting heated exhaust gases from the turbine and for discharging said gases into the atmosphere, a primary fuel nozzle in the combustion chamber adjacent to the air compressor adapted to inject primary fuel for combustion thereof in said combustion chamber, and a secondary fuel nozzle adapted to inject secondary fuel into an intermediate stage of said multistage gas turbine for combustion of said secondary fuel in said tail pipe, an axially movable bullet member mounted in said tail pipe for changing the cross sectional area of said exhaust nozzle, a servomotor having means driven thereby for moving said bullet member, a thermostatic control unit including a temperature sensing element located in said tail pipe adjacent to said turbine for controlling said servomotor and adapted to maintain a temperature at said sensing element below a predetermined maximum, a fuel supply tank, a primary fuel line to conduct fuel from said tank to said primary fuel nozzle, a secondary fuel line to conduct fuel from said tank to said secondary fuel nozzle, a primary fuel pump in said primary fuel line, a secondary fuel pump in said secondary fuel line, means for driving both of said fuel pumps simultaneously, a bypass valve connected across said primary fuel pump and including means connected to the engine main drive shaft responsive to shaft speed above a safe maximum for opening said bypass valve.

5. A turbo-jet engine comprising, an air compressor, a combustion chamber rearwardly of the compressor receiving air at one end from the air compressor, a gas turbine at the other end of the combustion chamber and adapted to be driven by heated gasses flowing from the combustion chamber, a main drive shaft connecting the air compressor and the gas turbine, a tail pipe and exhaust nozzle rearwardly of the gas turbine for conducting heated exhaust gases from the turbine and for discharging said gases into the atmosphere rearwardly of the turbo-jet engine, a primary fuel nozzle in the combustion chamber adjacent to the air compressor adapted to inject primary fuel for combustion thereof in said combustion chamber, and a secondary fuel nozzle adjacent to and forwardly of the gas turbine adapted to inject secondary fuel into the stream of heated gases flowing from the combustion chamber through the turbine for combustion of said secondary fuel after an ignition delay during which said secondary fuel is carried through said turbine, whereby combustion of said secondary fuel will be accomplished a definite distance rearwardly of said turbine.

6. A turbo-jet engine comprising, an air compressor, a combustion chamber rearwardly of the compressor receiving air at one end from the air compressor, a gas turbine at the other end of the combustion chamber and adapted to be driven by heated gases flowing from the combustion chamber, a main drive shaft connecting the air compressor and the gas turbine, a tail pipe and exhaust nozzle rearwardly of the gas turbine for conducting heated exhaust gases from the turbine and for discharging said gases into the atmosphere rearwardly of the turbo-jet engine, a primary fuel nozzle in the combustion chamber adjacent to the air compressor adapted to inject primary fuel for combustion thereof in said combustion chamber, a secondary fuel nozzle adjacent to and forwardly of the gas turbine adapted to inject secondary fuel into the stream of heated gases flowing from the combustion chamber through the turbine for combustion of said secondary fuel after an ignition delay during which said secondary fuel is carried through said turbine, whereby combustion of said secondary fuel will be accomplished a definite distance rearwardly of said turbine, movable means included in said tail pipe for varying the cross sectional area of said exhaust nozzle, a servomotor having means driven thereby for actuating said movable means, a thermostatic control unit including a temperature sensing element located in said tail pipe adajacent to said turbine for controlling said servomotor and adapted to maintain the temperature at said sensing element below a predetermined maximum.

7. A turbo-jet engine comprising, an air compressor, a combustion chamber rearwardly of the compressor receiving air at one end from the air compressor, a single-stage gas turbine at the other end of the combustion chamber and adapted to be driven by heated gases flowing from the combustion chamber, a main drive shaft located along the central axis of the engine and connecting the air compressor and the gas turbine, a tail pipe and exhaust nozzle rearwardly of the gas turbine for conducting heated exhaust gases from the turbine and for discharging said gases into the atmosphere rearwardly of the turbo-jet engine, a primary fuel nozzle in the combustion chamber adjacent to the air compressor adapted to inject primary fuel for combustion thereof in said combustion chamber, a secondary fuel nozzle adjacent to and forwardly of the gas turbine adapted to inject secondary fuel into the stream of heated gases flowing from the combustion chamber into the turbine, whereby combustion of said secondary fuel occurs in said tail pipe after passing unburned through said turbine and whereby the combustion of said secondary fuel in said tail pipe provides additional propulsive thrust for the turbo-jet engine, movable means included in said tail pipe for varying the cross sectional area of said exhaust nozzle, a servomotor having means driven thereby for actuating said movable means, a thermostatic control unit including a temperature sensing element located in said tail pipe adjacent to said turbine for controlling said servomotor and adapted to maintain the temperature at said sensing element below a predetermined maximum.

HEINZ E. SCHMITT.

REFERENCES CITED

The following references are of record in the file of this patent:

UNITED STATES PATENTS

| Number | Name | Date |
| --- | --- | --- |
| 2,095,991 | Lysholm | Oct. 19, 1937 |
| 2,243,467 | Jendrassik | May 27, 1941 |
| 2,326,072 | Seippel | Aug. 3, 1943 |
| 2,402,363 | Bradbury | June 18, 1946 |
| 2,409,176 | Allen | Oct. 15, 1946 |